(12) United States Patent
Fujikawa et al.

(10) Patent No.: US 11,942,612 B2
(45) Date of Patent: Mar. 26, 2024

(54) BATTERY SYSTEM

(71) Applicant: Panasonic Intellectual Property Management Co., Ltd., Osaka (JP)

(72) Inventors: Hiroshi Fujikawa, Osaka (JP); Shinichi Yuasa, Kyoto (JP); Yoshito Kaga, Osaka (JP); Keisuke Naito, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 633 days.

(21) Appl. No.: 17/254,289

(22) PCT Filed: May 8, 2019

(86) PCT No.: PCT/JP2019/018319
§ 371 (c)(1),
(2) Date: Dec. 20, 2020

(87) PCT Pub. No.: WO2019/244489
PCT Pub. Date: Dec. 26, 2019

(65) Prior Publication Data
US 2021/0273270 A1 Sep. 2, 2021

(30) Foreign Application Priority Data

Jun. 22, 2018 (JP) .................................. 2018-118770
Jun. 22, 2018 (JP) .................................. 2018-118771

(51) Int. Cl.
*H01M 10/44* (2006.01)
*B60L 50/60* (2019.01)
(Continued)

(52) U.S. Cl.
CPC ........... *H01M 10/443* (2013.01); *B60L 50/60* (2019.02); *B60L 53/00* (2019.02); *B60L 58/12* (2019.02);
(Continued)

(58) Field of Classification Search
CPC .. H01M 10/443; H01M 10/48; H01M 10/486; H01M 10/613; H01M 10/625;
(Continued)

(56) References Cited

U.S. PATENT DOCUMENTS 8,117,857 B2 * 2/2012 Kelty ...................... B60L 58/16
62/244
8,899,492 B2 * 12/2014 Kelty ...................... B60L 58/16
320/150
(Continued)

FOREIGN PATENT DOCUMENTS

JP 2007-141558 6/2007
JP 2012-080598 4/2012
(Continued)

OTHER PUBLICATIONS

International Search Report of PCT application No. PCT/JP2019/018319 dated Jul. 23, 2019.

*Primary Examiner* — Nha T Nguyen
(74) *Attorney, Agent, or Firm* — Rimon P.C.

(57) ABSTRACT

In a battery system, a battery module includes a plurality of cells. A management unit manages charging-discharging of the battery module and a temperature inside the battery module. The management unit estimates a maximum temperature of an inside of a cell in the battery module based on a measured temperature in the battery module, and controls, during charging-discharging of the battery module, a charging-discharging current of the battery module and/or cooling of the battery module in such a way that the estimated
(Continued)

maximum temperature does not exceed an upper limit temperature.

9 Claims, 11 Drawing Sheets

(51) Int. Cl.
B60L 53/00 (2019.01)
B60L 58/12 (2019.01)
B60L 58/26 (2019.01)
H01M 10/48 (2006.01)
H01M 10/613 (2014.01)
H01M 10/625 (2014.01)
H01M 10/633 (2014.01)
H01M 10/643 (2014.01)
H01M 10/647 (2014.01)
H01M 10/6556 (2014.01)
H01M 10/6568 (2014.01)
H02J 7/00 (2006.01)

(52) U.S. Cl.
CPC .......... B60L 58/26 (2019.02); H01M 10/48 (2013.01); H01M 10/486 (2013.01); H01M 10/613 (2015.04); H01M 10/625 (2015.04); H01M 10/633 (2015.04); H01M 10/643 (2015.04); H01M 10/647 (2015.04); H01M 10/6556 (2015.04); H01M 10/6568 (2015.04); H02J 7/0013 (2013.01); H02J 7/0047 (2013.01); H01M 2220/20 (2013.01)

(58) Field of Classification Search
CPC .......... H01M 10/633; H01M 10/643; H01M 10/647; H01M 10/6556; H01M 10/6568; H01M 2220/20; H01M 10/6567; B60L 50/60; B60L 53/00; B60L 58/12; B60L 58/26; B60L 2240/545; B60L 1/003; B60L 1/02; B60L 50/64; B60L 58/16; H02J 7/0013; H02J 7/0047; H02J 7/007194; Y02E 60/10; Y02T 10/70; Y02T 10/7072; Y02T 90/12; Y02T 90/14
See application file for complete search history.

(56) References Cited

U.S. PATENT DOCUMENTS

| | | | | |
|---|---|---|---|---|
| 10,193,197 | B2 * | 1/2019 | Machida | H01M 10/625 |
| 10,290,911 | B2 * | 5/2019 | Zhou | H01M 10/625 |
| 10,369,898 | B2 * | 8/2019 | Newman | B60L 58/26 |
| 10,882,409 | B2 * | 1/2021 | Nakaso | B60L 53/18 |
| 10,882,413 | B2 * | 1/2021 | Ferran | H01M 10/63 |
| 10,962,598 | B2 * | 3/2021 | Suzuki | H01M 10/0585 |
| 11,117,477 | B2 * | 9/2021 | Smith | H01M 10/65 |
| 11,220,951 | B2 * | 1/2022 | Kwon | B60K 11/085 |
| 11,342,603 | B2 * | 5/2022 | Tomai | B60L 58/25 |
| 11,509,007 | B2 * | 11/2022 | Shimizu | H01M 10/6568 |
| 2012/0021258 | A1 * | 1/2012 | Kelty | H01M 10/625 |
| | | | | 429/50 |
| 2014/0095092 | A1 * | 4/2014 | Ikeda | G01R 31/382 |
| | | | | 702/63 |
| 2014/0197803 | A1 | 7/2014 | Ishikawa | |
| 2014/0377605 | A1 | 12/2014 | Debert et al. | |
| 2015/0306974 | A1 * | 10/2015 | Mardall | H01M 10/625 |
| | | | | 429/120 |
| 2016/0013510 | A1 * | 1/2016 | Powell | H02J 50/12 |
| | | | | 320/108 |
| 2016/0226111 | A1 * | 8/2016 | Blume | H01M 10/6572 |
| 2016/0276719 | A1 | 9/2016 | Kikuchi | |
| 2016/0318370 | A1 * | 11/2016 | Rawlinson | B60H 1/32281 |
| 2017/0324118 | A1 * | 11/2017 | Ishishita | H01M 10/443 |
| 2018/0034122 | A1 * | 2/2018 | Newman | H01M 10/6551 |
| 2018/0048037 | A1 * | 2/2018 | Newman | H01M 10/6561 |
| 2018/0048039 | A1 * | 2/2018 | Newman | H01M 10/625 |
| 2019/0016232 | A1 * | 1/2019 | Kim | H01M 10/44 |
| 2019/0363411 | A1 * | 11/2019 | Takeuchi | H01M 10/6552 |
| 2020/0243930 | A1 * | 7/2020 | Raedler | H01M 10/63 |

FOREIGN PATENT DOCUMENTS

| | | |
|---|---|---|
| JP | 2014-026825 | 2/2014 |
| JP | 2014-137890 | 7/2014 |
| JP | 2014-531711 | 11/2014 |
| JP | 2016-173957 | 9/2016 |

* cited by examiner

| Measurement point temperature, environmental temperature, cooling liquid temperature | Maximum temperature |
|---|---|
| xx,xx,xx | yy |
| xx,xx,xx | yy |
| xx,xx,xx | yy |
| ⋮ | ⋮ |
| xx,xx,xx | yy |

12t

| Maximum temperature | | | | | |
|---|---|---|---|---|---|
| Environmental temperature 25[°C] | | Measurement point temperature [°C] | | | |
| | | 35 | 36 | 37 | 38 |
| Cooling liquid temperature [°C] | 15 | 45 | 46 | 49 | 50 |
| | 16 | 46 | 47 | 50 | 51 |
| | 17 | 47 | 48 | 51 | 52 |

FIG. 10A
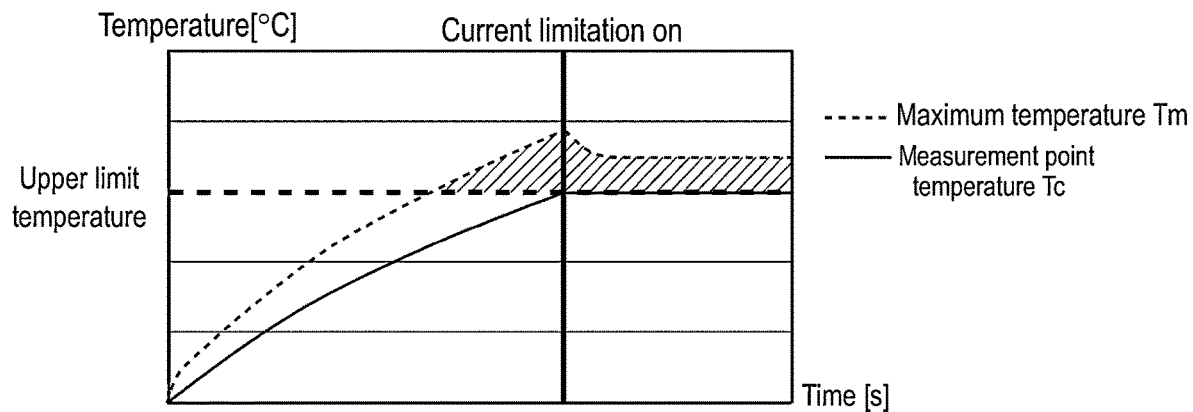
FIG. 10B
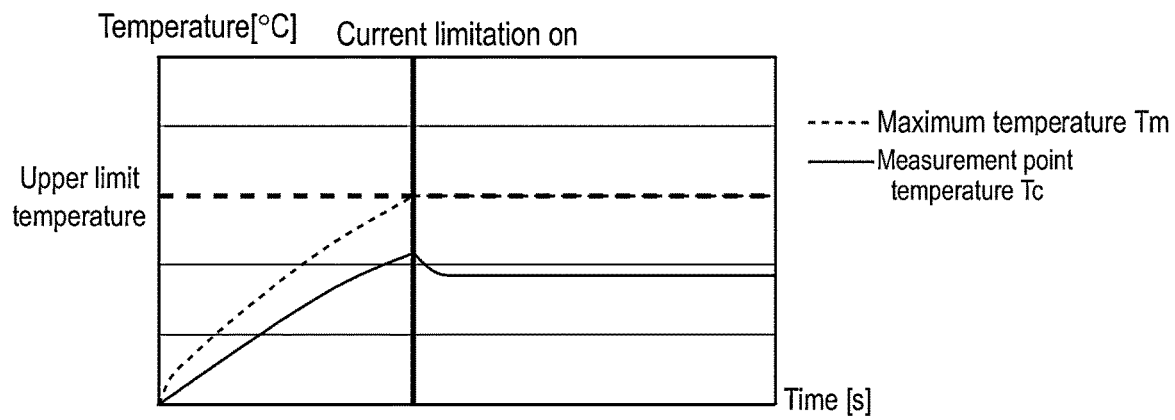
FIG. 11
| Measurement point temperature, environmental temperature, cooling liquid temperature, flow rate, current | Maximum temperature |
|---|---|
| xx,xx,xx,xx,xx | yy |
| xx,xx,xx,xx,xx | yy |
| xx,xx,xx,xx,xx | yy |
| ⋮ | ⋮ |
| xx,xx,xx,xx,xx | yy |
12t

BATTERY SYSTEM

CROSS-REFERENCE TO RELATED APPLICATIONS

This application is a U.S. national stage application of the PCT International Application No. PCT/JP2019/018319 filed on May 8, 2019, which claims the benefit of foreign priority of Japanese patent application No. 2018-118770 and 2018-118771, filed on Jun. 22, 2018, the contents all of which are incorporated herein by reference.

TECHNICAL FIELD

The present invention relates to a battery system including a battery module that includes a plurality of cells.

BACKGROUND ART

In recent years, hybrid vehicles (HV), plug-in hybrid vehicles (PHV), and electric vehicles (EV) are becoming popular. Secondary batteries are installed as key devices in these electric vehicles. Nickel hydrogen batteries and lithium-ion batteries are mainly used as in-vehicle secondary batteries. It is expected that the popularization of lithium-ion batteries with high energy density will accelerate in the future.

Degradation of a secondary battery can be approximated by the sum of storage degradation and cycle degradation. Of these, the storage degradation depends on a state of charge (SOC) and a temperature. The cycle degradation depends on an SOC range, a temperature, and a current rate to be used. Both the storage degradation and the cycle degradation tend to progress as the temperature rises.

Accordingly, it is demanded to suppress a temperature rise of the secondary battery. For example, there have been proposed a method that reduces a current when a measured temperature of a charge-discharge controlling circuit is higher than a maximum surface temperature of an assembled battery (see, for example, PTL 1), and a method that measures an outer wall temperature of a module, and estimates a core temperature from one-dimensional analysis (see, for example, PTL 2).

Further, for example, there has been proposed a method that estimates a temperature rise of a battery based on a calorific value of the battery and an oxygen absorption reaction duration after ignition off that are estimated from a measured temperature of the battery and, when the temperature rise is large, cools the battery with an electric cooling fan even after ignition off (see, for example, PTL 3).

CITATION LIST

Patent Literature

PTL 1: Unexamined Japanese Patent Publication No. 2012-080598
PTL 2: Unexamined Japanese Patent Publication No. 2014-531711
PTL 3: Unexamined Japanese Patent Publication No. 2016-173957

SUMMARY OF THE INVENTION

In a normal battery system, in order to suppress degradation, a surface temperature of a cell is measured, and control such as current limitation, charge-discharge stoppage, or cooling is performed in such a way that the measured temperature does not exceed an upper limit temperature. However, depending on the structure and usage of the battery, the temperature of an electrode body inside the cell may be significantly higher than the surface temperature of the cell. For example, when a large current is flowing, the temperature of the electrode body in the cell rises significantly due to Joule heat.

Further, in a cooling system of the normal battery system, only a portion (for example, a bottom surface) of a battery module can be cooled, and thus temperature unevenness occurs in the battery module during charging-discharging. Similarly, temperature unevenness occurs in a single cell.

Therefore, the cells included in the battery module are not appropriately managed in temperature due to the presence of a portion that becomes significantly higher than the measured temperature, and thus degradation progresses.

The present invention has been made in view of such circumstances, and has an object to provide a technique for suppressing degradation of cells included in a battery module.

In order to solve the above problems, a battery system according to an aspect of the present invention includes a battery module that includes a plurality of cells, and a management unit that manages charging-discharging of the battery module and a temperature inside the battery module. The management unit estimates a maximum temperature of an inside of a cell in the battery module based on a measured temperature in the battery module, and controls, during charging-discharging of the battery module, a charging-discharging current of the battery module and/or cooling of the battery module in such a way that the estimated maximum temperature does not exceed an upper limit temperature.

Further, a battery system according to an aspect of the present invention includes a battery module that includes a plurality of cells, and a management unit that manages charging-discharging of the battery module and a temperature inside the battery module. The management unit estimates a maximum temperature of an inside of a cell in the battery module based on a measured temperature in the battery module, and cools the battery module when the estimated maximum temperature exceeds an upper limit temperature after termination of charging-discharging of the battery module until the estimated maximum temperature becomes less than or equal to the upper limit temperature.

According to the present invention, degradation of cells included in a battery module can be suppressed.

BRIEF DESCRIPTION OF DRAWINGS

FIG. 10A is a diagram illustrating specific image of time transitions of a measurement point temperature and a maximum temperature when temperature control is performed in such a way that measurement point temperature Tc does not exceed an upper limit temperature in a conventional technique.

FIG. 10B is a diagram illustrating specific image of time transitions of a measurement point temperature and a maximum temperature when temperature control is performed in such a way that measurement point temperature Te does not exceed an upper limit temperature in the present invention.

FIG. 11 is a diagram illustrating a table defining relationships between the measurement point temperature on the surface of the cell, the environmental temperature in the battery module, a cooling liquid temperature, a flow rate of cooling liquid, a current flowing in the battery module, and the maximum temperature in the battery module.

DESCRIPTION OF EMBODIMENT

Figure 1:
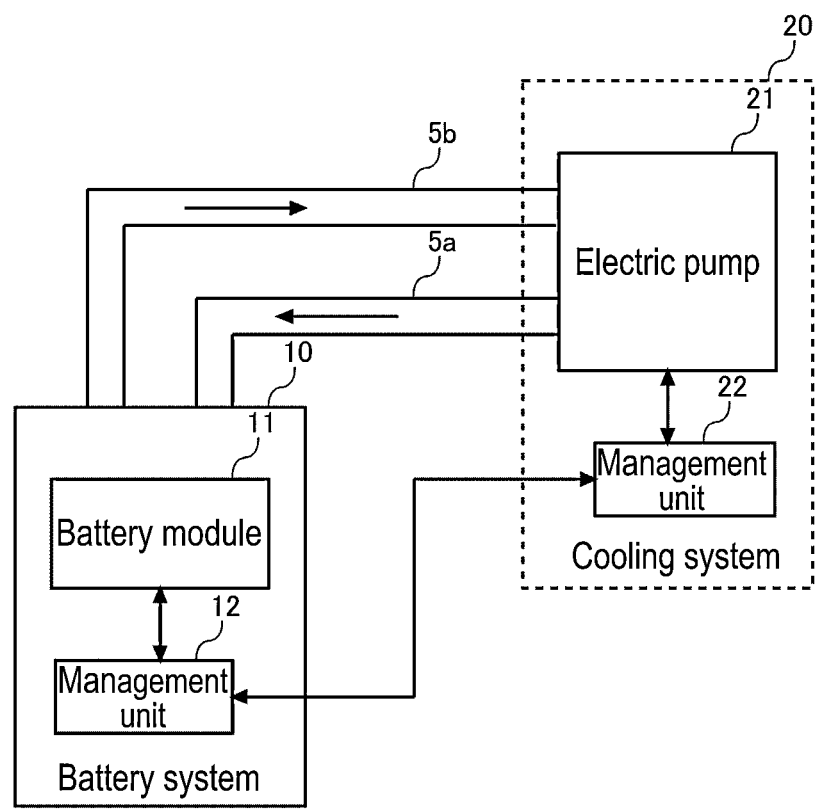
FIG. 1 is a diagram for explaining a battery system according to an exemplary embodiment of the present invention.

FIG. 1 is a diagram for explaining battery system 10 according to an exemplary embodiment of the present invention. Battery system 10 is configured in one battery pack and includes battery module 11 and management unit 12. Although only one battery module 11 is illustrated in FIG. 1, usually, a plurality of battery modules 11 is configured by connecting in series or connecting in series-parallel in one battery pack. A high voltage can be achieved by connecting a plurality of battery modules 11 in series, and a large capacity can be achieved by connecting a plurality of battery modules 11 in parallel.

In the present exemplary embodiment, in order to cool battery system 10, cooperation is made with cooling system 20 of liquid cooling type. Cooling system 20 includes electric pump 21 and management unit 22. Electric pump 21 and battery system 10 are connected by injection pipe 5a and discharge pipe 5b. Electric pump 21 includes a motor, and circulates cooling liquid (for example, water, cooling liquid) in injection pipe 5a and discharge pipe 5b. Cooling system 20 has a radiator such as a radiation fin (not illustrated), and cools the cooling liquid returned via discharge pipe 5b. Note that the cooling liquid may be cooled by cooling air from an electric fan or an air conditioner.

Management unit 12 of battery system 10 mainly manages charge-discharge of battery module 11 and temperatures inside battery module 11. Management unit 22 of cooling system 20 manages operation and stop of electric pump 21 and a flow rate of the cooling liquid delivered from electric pump 21. The flow rate of the cooling liquid to be delivered can be controlled by rotation speed of the motor included in electric pump 21. Note that when an electric fan or an air conditioner is installed, the temperature of the cooling liquid can be controlled by controlling rotation speed of the electric fan or set temperature of the air conditioner.

Management unit 12 of battery system 10 and management unit 22 of cooling system 20 are connected with a communication line. For example, when battery system 10 and cooling system 20 are mounted on a vehicle, an on-vehicle network (for example, controller area network (CAN) or local interconnect network (LIN)) connects management unit 12 of battery system 10 and management unit 22 of cooling system 20.

Figure 2:
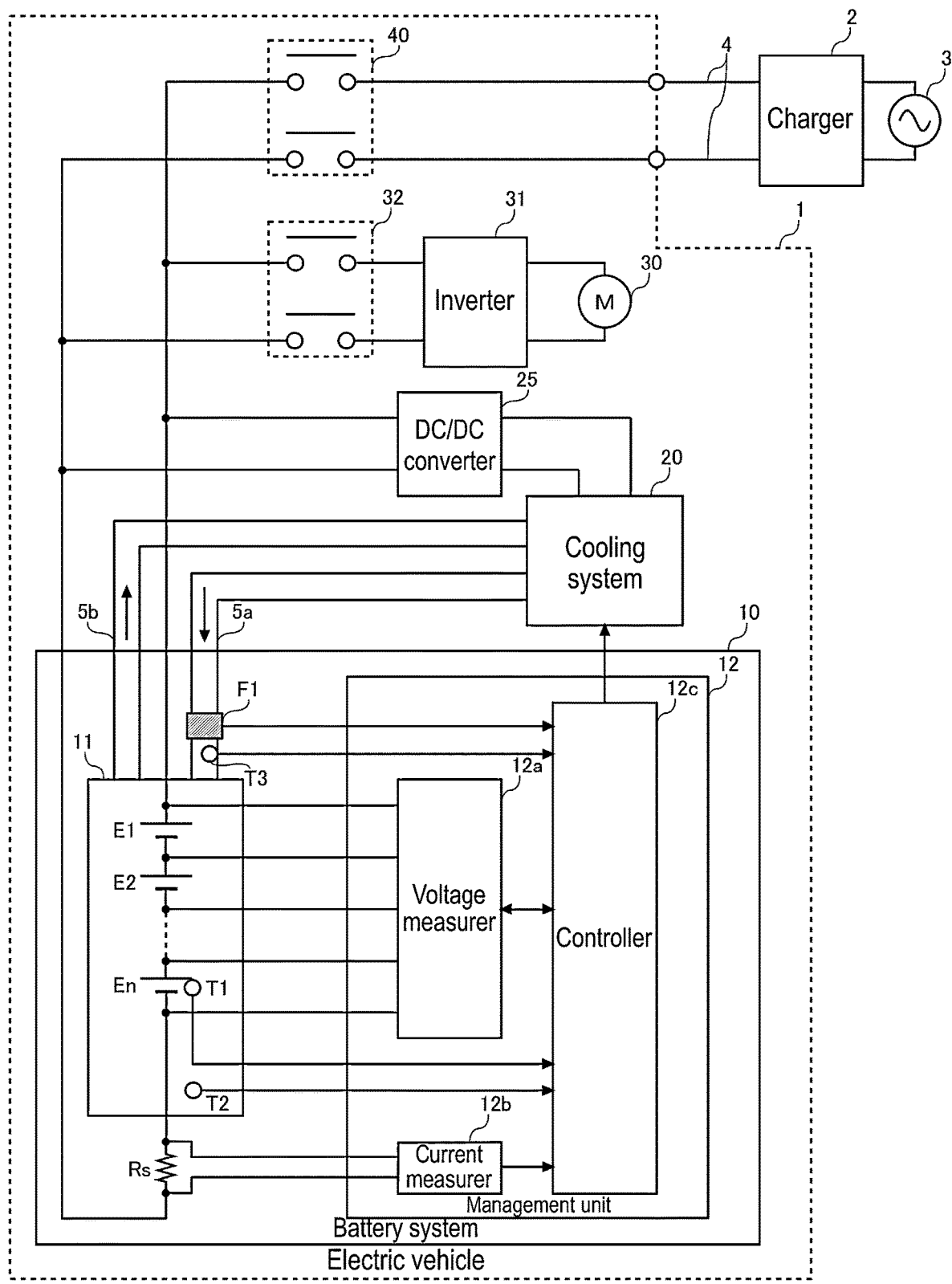
FIG. 2 is a diagram for explaining an electric vehicle equipped with the battery system according to the exemplary embodiment of the present invention.

FIG. 2 is a diagram for explaining electric vehicle 1 equipped with battery system 10 according to the exemplary embodiment of the present invention. Electric vehicle 1 is assumed to be an EV or PHV that can be charged from charger 2 installed outside.

Battery system 10 is connected to motor 30 via first relay 32 and inverter 31. Inverter 31 converts DC power supplied from battery system 10 into AC power and supplies the AC power to motor 30 at the time of power running. At the time of regeneration, AC power supplied from motor 30 is converted into DC power and supplied to battery system 10. Motor 30 is a three-phase AC motor and rotates according to AC power supplied from inverter 31 at the time of power running. At the time of regeneration, rotational energy due to deceleration is converted into AC power and supplied to inverter 31.

First relay 32 is inserted between wires that connect battery module 11 and inverter 31. During traveling, management unit 12 of battery system 10 controls first relay 32 to be in an ON state (closed state), and electrically connects battery system 10 and a motive-power system of electric vehicle 1. When the vehicle is not traveling, management unit 12 basically controls first relay 32 to be in an off state (open state), and electrically disconnects battery system 10 and the motive-power system of electric vehicle 1. Note that instead of the relay, another type of switch such as a semiconductor switch may be used.

Battery system 10 can be charged from commercial power system 3 by connecting to charger 2 installed outside electric vehicle 1 with charging cable 4. Charger 2 is installed in a home, a car dealer, a service area, a commercial facility, a public facility, or the like. Charger 2 is connected to commercial power system 3 and charges battery system 10 in electric vehicle 1 via charging cable 4. In the vehicle, second relay 40 is inserted between wires connecting battery system 10 and charger 2. Note that instead of the relay, another type of switch such as a semiconductor switch may be used. Management unit 12 of battery system 10 controls second relay 40 to be in an on state (closed state) before starting charging, and controls second relay 40 to be in an off state (open state) after termination of charging.

Generally, it is charged with alternating current in a case of normal charging or charged with direct current in a case of quick charging. When charged with alternating current, AC power is converted to DC power by an AC-DC converter (not illustrated) inserted between second relay 40 and battery system 10.

A current path for providing a power source to cooling system 20 is branched from a main current path connecting battery system 10 and inverter 31. Direct current-direct current (DC-DC) converter 25 is inserted on the branched current path. DC-DC converter 25 reduces voltage of battery system 10, which is voltage of the main current path, and supplies the voltage to cooling system 20. Note that a configuration may be employed in which the power source of cooling system 20 is provided not by battery system 10 but by an auxiliary battery that is not illustrated (usually a lead battery with 12 V output).

Battery module 11 includes a plurality of cells E1 to En. A secondary battery such as a lithium ion battery cell, a nickel hydrogen battery cell, or a lead battery cell can be used as the cell. Hereinafter, in the present description, an example of using a lithium ion battery cell (nominal voltage: 3.6 V to 3.7 V) is assumed. Although FIG. 2 illustrates an example in which a plurality of cells E1 to En is connected in series, a plurality of cells may be connected in series-parallel. Further, although only one battery module 11 is illustrated in FIG. 2, a plurality of battery modules 11 may be configured by connecting in series or connecting in series-parallel as described above.

Management unit 12 includes voltage measurer 12a, current measurer 12b, and controller 12c. Voltage measurer 12a and each node of the plurality of cells E1 to En connected in series are connected by a plurality of voltage lines. Voltage measurer 12a measures voltage between each two adjacent voltage lines to measure voltage of each cell E1 to En. Voltage measurer 12a transmits the measured voltage of each cell E1 to En to controller 12c.

Shunt resistor Rs is connected to a current path of battery module 11. Shunt resistor Rs functions as a current detection element. Note that a Hall element may be used instead of shunt resistor Rs. Current measurer 12b amplifies voltage across shunt resistor Rs and outputs the voltage to controller 12c. Controller 12c estimates a value of current flowing through battery module 11 based on a value of the voltage input from current measurer 12b.

First temperature sensor T1 is installed on a surface of at least one of the plurality of cells E1 to En. For example, first temperature sensor T1 may be installed per every several cells. At that time, it is desirable that first temperature sensors T1 are installed respectively on cells at positions as distributed as possible in battery module 11. Note that if cost is acceptable, first temperature sensor T1 may be installed on each of cells E1 to En in battery module 11. For simplification, FIG. 2 illustrates a diagram in which first temperature sensor T1 is typically installed only on cell En. First temperature sensor T1 measures a temperature of the surface of cell En, which is a measurement point, and outputs the temperature to controller 12c.

Second temperature sensor T2 is a temperature sensor that measures the environmental temperature in battery module 11, and is installed in battery module 11 in a state of being in non-contact with the plurality of cells E1 to En. Note that second temperature sensor T2 may be installed outside battery module 11 in the battery pack as long as it is near battery module 11. Second temperature sensor T2 measures an environmental temperature inside battery module 11 or the battery pack and outputs the temperature to controller 12c. A thermistor or a thermocouple can be used for first temperature sensor T1 and second temperature sensor T2.

Third temperature sensor T3 is installed in injection pipe 5a through which the cooling liquid is sent from cooling system 20 to battery module 11. Third temperature sensor T3 measures a temperature of the cooling liquid flowing in injection pipe 5a and outputs the temperature to controller 12c. A general water temperature gauge can be used for third temperature sensor T3.

Flow rate sensor F1 measures a flow rate of the cooling liquid flowing in injection pipe 5a and outputs the flow rate to controller 12c. A clamp-on type, an electromagnetic type, a Coriolis type, an impeller type, or the like can be used as flow rate sensor F1. Note that a sensor in which flow rate sensor F1 and third temperature sensor T3 are integrated may be used.

Controller 12c can be configured by a microcomputer and a non-volatile memory (for example, electrically erasable programmable read-only memory (EEPROM) or flash memory). Controller 12c manages states of the plurality of cells E1 to En in battery module 11 based on the voltages of the plurality of cells E1 to En measured by voltage measurer 12a, the current flowing through battery module 11 measured by current measurer 12b, and the temperature of the plurality of cells E1 to En measured by first temperature sensor T1.

Controller 12c estimates the SOC and a state of health (SOH) of each of the plurality of cells E1 to En. SOC can be estimated by an open circuit voltage (OCV) method or a current integration method. The OCV method is a method of estimating the SOC based on the OCV of each cell E1 to En measured by the voltage measurer 12a and characteristic data of an SOC-OCV curve held in the non-volatile memory. The current integration method is a method of estimating the SOC based on the OCV at a start of charging-discharging of each cell E1 to En measured by voltage measurer 12a and an integrated value of the current measured by current measurer 12b.

The SOH is defined as the ratio of a current full charge capacity to an initial full charge capacity, where the lower the value (the closer to 0%), the more the degradation progresses. The SOH may be obtained by measuring a capacity by complete charge or discharge, or may be obtained by adding storage degradation and cycle degradation. The storage degradation can be estimated based on the SOC, a temperature, and a storage degradation rate. The cycle degradation can be estimated based on an SOC range used, a temperature, a current rate, and a cycle degradation rate. The storage degradation rate and the cycle degradation rate can be derived in advance by experiments or simulations. The SOC, a temperature, an SOC range, and a current rate can be determined by measurement.

Further, the SOH can also be estimated based on a correlation with internal resistance of a cell. The internal resistance can be estimated by dividing a voltage drop generated when a predetermined current is passed through the cell for a predetermined time by the value of the current value. The internal resistance has a relationship of decreasing as the temperature rises, and has a relationship of increasing as the SOH decreases.

When an abnormality (for example, overvoltage, undervoltage, overcurrent, or temperature abnormality) occurs in at least one of the plurality of cells E1 to En, controller 12c turns off first relay 32 to protect the cell.

Controller 12c manages a temperature inside battery module 11. Neither the surface temperature of the cell measured by first temperature sensor T1 nor the environmental temperature inside battery module 11 measured by second temperature sensor T2 indicates a true maximum temperature inside battery module 11. The true maximum temperature inside battery module 11 is the temperature of an inside of any one of the cells. However, since it is difficult to insert the temperature sensor inside the cells, it is necessary to estimate the temperature from the outside temperature.

Figure 3A:
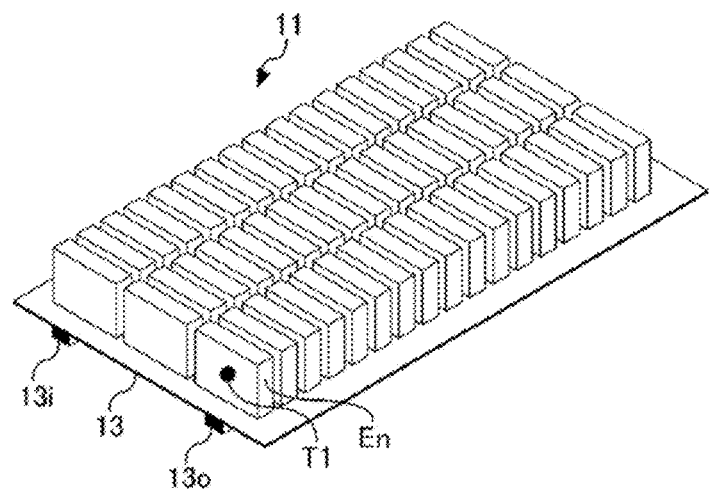
FIG. 3A is a perspective view schematically illustrating a battery module that includes a plurality of rectangular cells.
Figure 3B:
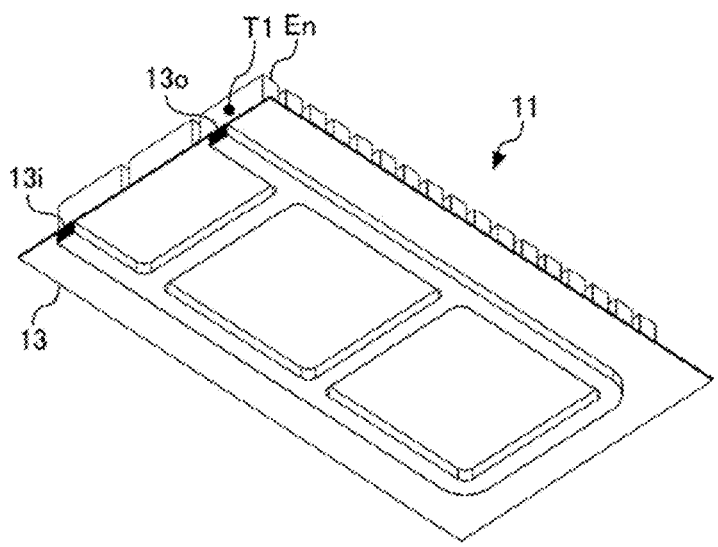
FIG. 3B is a perspective view schematically illustrating a battery module that includes a plurality of rectangular cells.

FIGS. 3A and 3B are perspective views schematically illustrating battery module 11 that includes a plurality of rectangular cells. FIG. 3A is a perspective view seen from above, and FIG. 3B is a perspective view seen from below. The plurality of rectangular cells is aligned and arranged on cooling plate 13. Note that FIGS. 3A and 3B are drawn by omitting members such as holders and binders for fixing the plurality of rectangular cells, electrode terminals of the rectangular cells, and bus bars for electrically connecting a plurality of electrode terminals.

In cooling plate 13, a flow path is formed through which the cooling liquid supplied from cooling system 20 passes. Cooling plate 13 may be made of metal or resin. The metal has higher heat transfer property. Inlet 13i of cooling plate 13 is connected to injection pipe 5a, and outlet 13o of cooling plate 13 is connected to discharge pipe 5b. The flow path in cooling plate 13 is formed in a U shape, and a plurality (two in FIG. 3B) of shortcut flow paths are formed inside the U shape.

Generally, an exterior can of the cell is made of metal (for example, aluminum or aluminum alloy). When cooling plate 13 is made of metal as described above, it is necessary to sandwich an insulating heat conductive sheet between cooling plate 13 and bottom surfaces of the plurality of rectangular cells. When at least one of the exterior can of the cell and cooling plate 13 is made of an insulating material, it is not necessary to sandwich the insulating heat conductive sheet.

The temperature of the cooling liquid flowing through the flow path in cooling plate 13 is the lowest immediately after entering inlet 13i, and the highest immediately before exiting outlet 13o. Therefore, cooling plate 13 has the lowest cooling capacity near outlet 13o, and the temperature of cell En at a position closest to outlet 13o tends to be the highest.

In FIGS. 3A and 3B, first temperature sensor T1 is attached to cell En at the position closest to outlet 13o. First temperature sensor T1 illustrated in FIGS. 3A and 3B is a temperature sensor attached to a cell to be at a highest temperature in battery module 11. The cell to be at the highest temperature in battery module 11 is specified by a numerical simulation or experiment in advance. FIGS. 3A and 3B illustrate an example in which cell En at a position closest to outlet 13o is the cell to be at the highest temperature, but depending on the arrangement of the plurality of cells, a place where heat easily accumulates may occur, and the cell closest to this place may be the cell to be at the highest temperature.

Figure 4A:
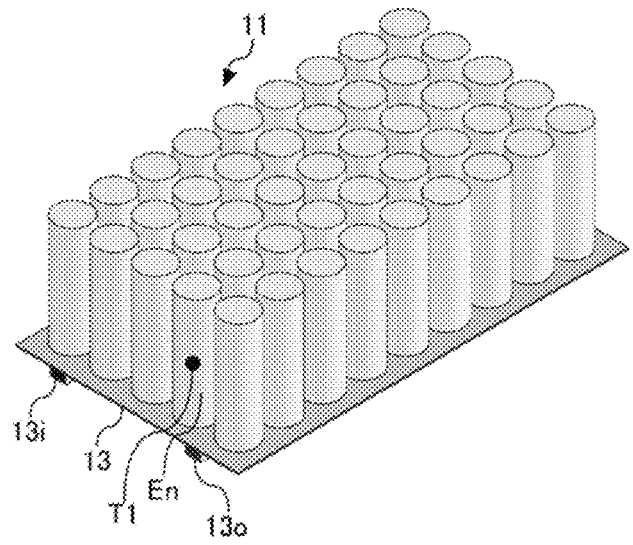
FIG. 4A is a perspective view schematically illustrating a battery module that includes a plurality of cylindrical cells.

Note that as described above, in practice, first temperature sensor T1 is attached per every several cells other than the cell to be at the highest temperature to protect the cells. Further, when it is physically difficult to attach first temperature sensor T1 to the cell to be at the highest temperature, first temperature sensor T1 is attached to a cell capable of estimating the maximum temperature of the cell to be at the highest temperature. FIGS. 4A and 3B illustrate only first temperature sensor T1 attached to a surface of the cell to be at the highest temperature, which is basic data for estimating a true maximum temperature in battery module 11.

Figure 4B:
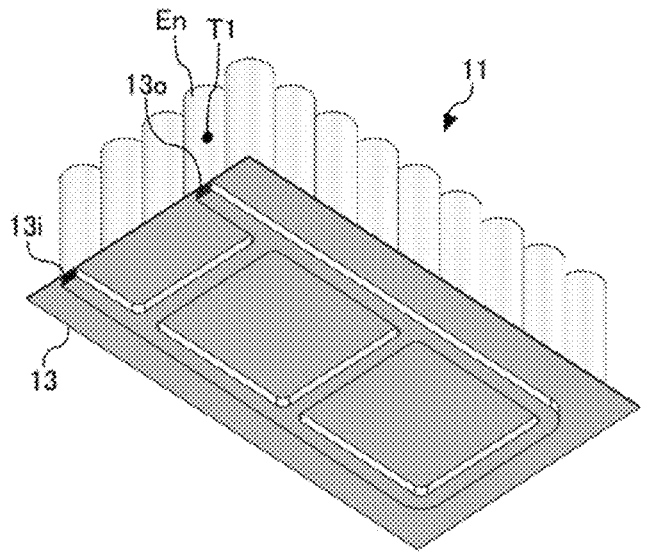
FIG. 4B is a perspective view schematically illustrating a battery module that includes a plurality of cylindrical cells.

FIGS. 4A and 4B are perspective views schematically illustrating battery module 11 that includes a plurality of cylindrical cells. FIG. 4A is a perspective view seen from above, and FIG. 4B is a perspective view seen from below. The plurality of cylindrical cells is aligned and arranged on cooling plate 13. An exterior can of a cylindrical cell is generally made of iron. Note that battery module 11 that includes the plurality of cylindrical cells illustrated in FIGS. 4A and 4B is basically the same as battery module 11 that includes a plurality of rectangular cells illustrated in FIGS. 3A and 3B except for the shape of the cell, and the considerations illustrated in FIGS. 3A and 3B also apply to FIGS. 4A and 4B.

Figures 5, 6, 7:
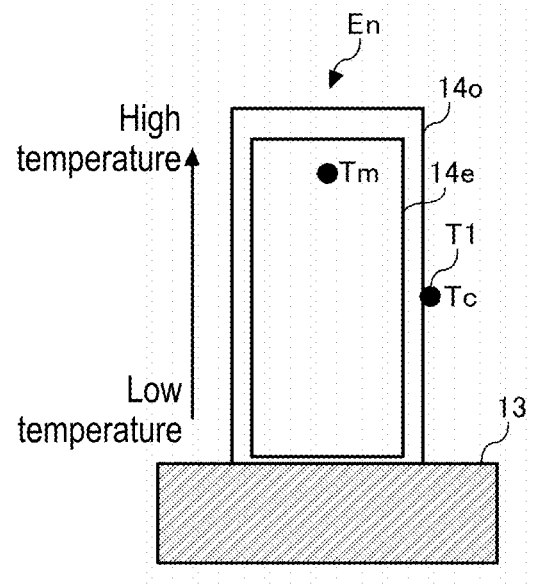
FIG. 5 is a diagram illustrating a temperature distribution of one cylindrical cell illustrated in FIGS. 4A and 4B.
FIG. 6 is a diagram illustrating a table defining relationships between a measurement point temperature on a surface of a cell, an environmental temperature in the battery module, and a cooling liquid temperature and a maximum temperature in the battery module.
FIG. 7 is a diagram illustrating a specific example of a temperature map illustrating a part of the table illustrated in FIG. 6.

FIG. 5 is a diagram illustrating a temperature distribution of one cylindrical cell En illustrated in FIGS. 4A and 4B. One cell En is formed so as to cover electrode body 14e with exterior can 14o. Electrode body 14e includes a positive electrode, a separator, and a negative electrode. In an example illustrated in FIG. 5, since cooling plate 13 is installed on a bottom surface of cell En, the temperature becomes lower as it is closer to the bottom surface of cell En, and the temperature becomes higher as it is closer to a top surface of cell En. As described above, since only a portion (the bottom surface in the example illustrated in FIG. 5) of cell En is cooled, a temperature gradient is generated inside cell En. First temperature sensor T1 is attached to an outer surface of exterior can 14o.

Depending on the method of using cell En, maximum temperature Tm of electrode body 14e of an inside of cell En may be significantly higher than temperature Tc at the measurement point on the surface of cell En. For example, when a large current is flowing through cell En, a large amount of Joule heat is generated inside cell En, and the temperature of electrode body 14e inside is significantly higher than a surface temperature outside cell En. Further, in recent years, the size of cell En tends to increase due to increase in capacity, and the larger the size of cell En, the larger the difference between the temperature of electrode body 14e inside when a current flows and the outer surface temperature.

FIG. 6 illustrates table 12t defining relationships between measurement point temperature Tc on the surface of cell En, environmental temperature Te in battery module 11, and cooling liquid temperature Tw and maximum temperature Tm in battery module 11. Based on numerical simulations and experiments in advance, the designer derives maximum temperature Tm for each of various combinations of three parameters of measurement point temperature Tc, environmental temperature Te, and cooling liquid temperature Tw, and creates a database of relationships of them. Table 12t created based on the database is registered in the non-volatile memory in controller 12c. Note that the relationships between the three parameters of measurement point temperature Tc, environmental temperature Te, and cooling liquid temperature Tw and maximum temperature Tm may each be defined as a function. Even in that case, a derived function is registered in the non-volatile memory in controller 12c.

FIG. 7 is a diagram illustrating a specific example of a temperature map illustrating a part of table 12t illustrated in FIG. 6. The temperature map illustrated in FIG. 7 is the part of table 12t when environmental temperature Te is 25° C. In this example, conditions that maximum temperature Tm in battery module 11 to be the upper limit temperature as described later exceeds include a combination that cooling liquid temperature Tw is 15° C. and measurement point temperature Tc is 38° C., a combination that cooling liquid temperature Tw is 16° C. and measurement point temperature Tc is 37° C., a combination that cooling liquid temperature Tw of 16° C. and measurement point temperature Tc is 38° C., a combination that cooling liquid temperature Tw of 17° C. and measurement point temperature Tc is 37° C., and a combination that cooling liquid temperature Tw of 17° C. and measurement point temperature Tc is 38° C.

Thus, based on measurement point temperature Tc measured by first temperature sensor T1, environmental temperature Te measured by second temperature sensor T2, and cooling liquid temperature Tw measured by third temperature sensor T3, controller 12c can estimate maximum temperature Tm in battery module 11 with reference to table 12t created in advance.

Figure 8:
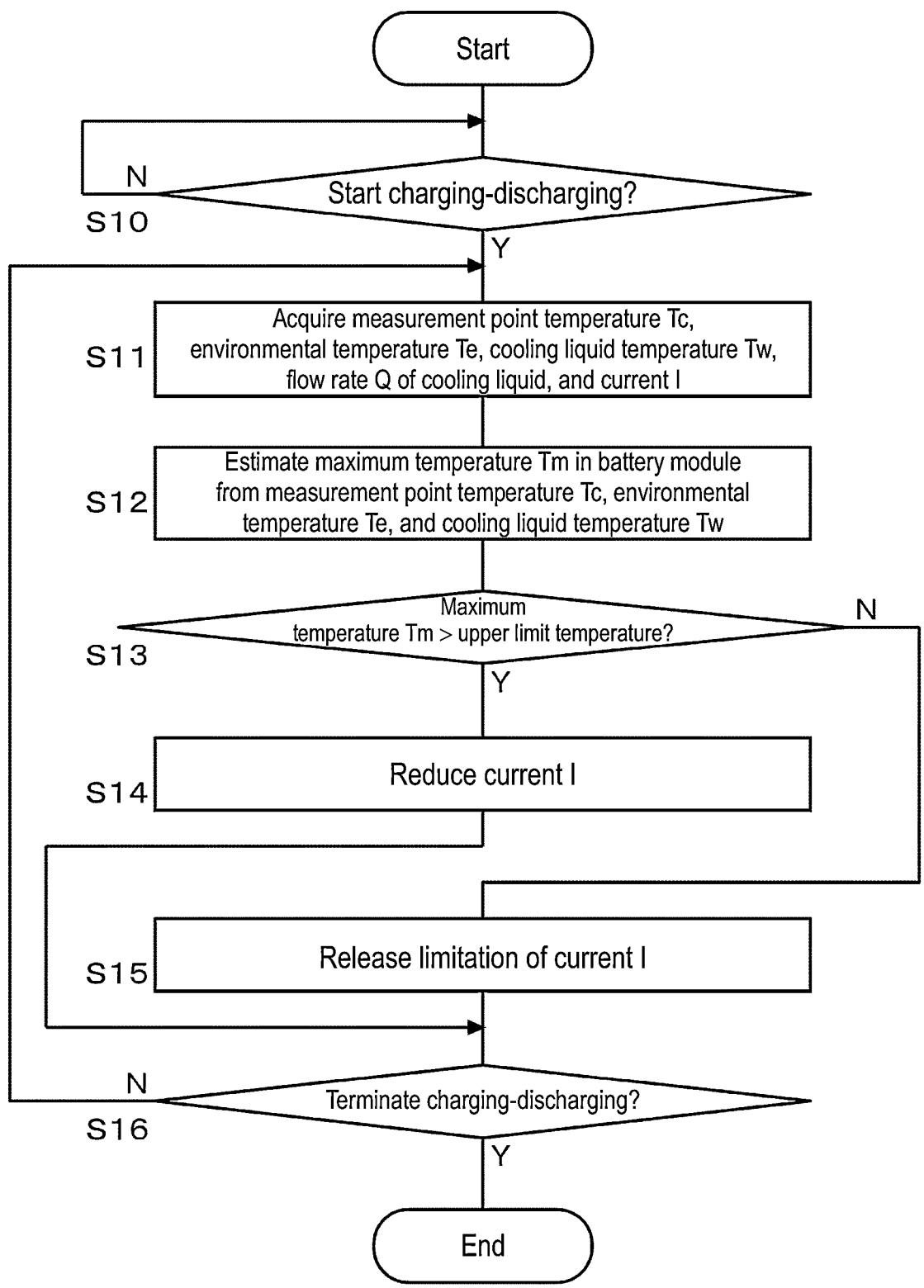
FIG. 8 is a flowchart illustrating temperature control example 1 of the battery module by a controller.

FIG. 8 is a flowchart illustrating temperature control example 1 of battery module 11 by controller 12c. When electric vehicle 1 is powered on, controller 12c turns on first relay 32 to bring battery system 10 and motor 30 into conduction, and starts charging-discharging battery module 11 (Y in S10). Controller 12c obtains measurement point temperature Tc of the surface of cell En from first temperature sensor T1, environmental temperature Te in battery module 11 from second temperature sensor T2, cooling liquid temperature Tw from third temperature sensor T3, flow rate Q of the cooling liquid from flow rate sensor F1, and current I flowing to battery module 11 from current measurer 12b (S11).

Controller 12c estimates maximum temperature Tm in battery module 11 with reference to table 12t based on acquired measurement point temperature Tc, environmental temperature Te, and cooling liquid temperature Tw (S12). Controller 12c compares estimated maximum temperature Tm with a predetermined upper limit temperature (for example, 50° C.) (S13).

When maximum temperature Tm exceeds the upper limit temperature (Y in S13), controller 12c sets a current command value lower than current I acquired from current measurer 12b in inverter 31, and current I flowing in battery module 11 is reduced (S14). For example, controller 12c sets a current command value that is reduced by 5% to 10% from acquired current I. Note that another DC-DC converter may be provided between battery module 11 and inverter 31 and current I flowing in battery module 11 may be adjusted by the DC-DC converter. During a period in which maximum temperature Tm exceeds the upper limit temperature, current limitation based on the temperature control by controller 12c has priority over current control based on an accelerator pedal opening and speed control by an autonomous driving controller.

When maximum temperature Tm is less than or equal to the upper limit temperature in step S13 (N in S13), step S14 is skipped. Further, when the current limitation based on the temperature control by controller 12c has been applied, the current limitation is released (S15). When the current limitation is released, the current control based on the accelerator pedal opening and the speed control by the autonomous driving controller regains priority.

When electric vehicle 1 is stopped from the traveling state and powered off, controller 12c turns off first relay 32, shuts off battery system 10 and motor 30, and terminates charging-discharging of battery module 11 (Y in S16). While electric vehicle 1 is traveling (N in S16), the process proceeds to step S11, and the processes from step S11 to step S15 are repeated.

Figure 9:
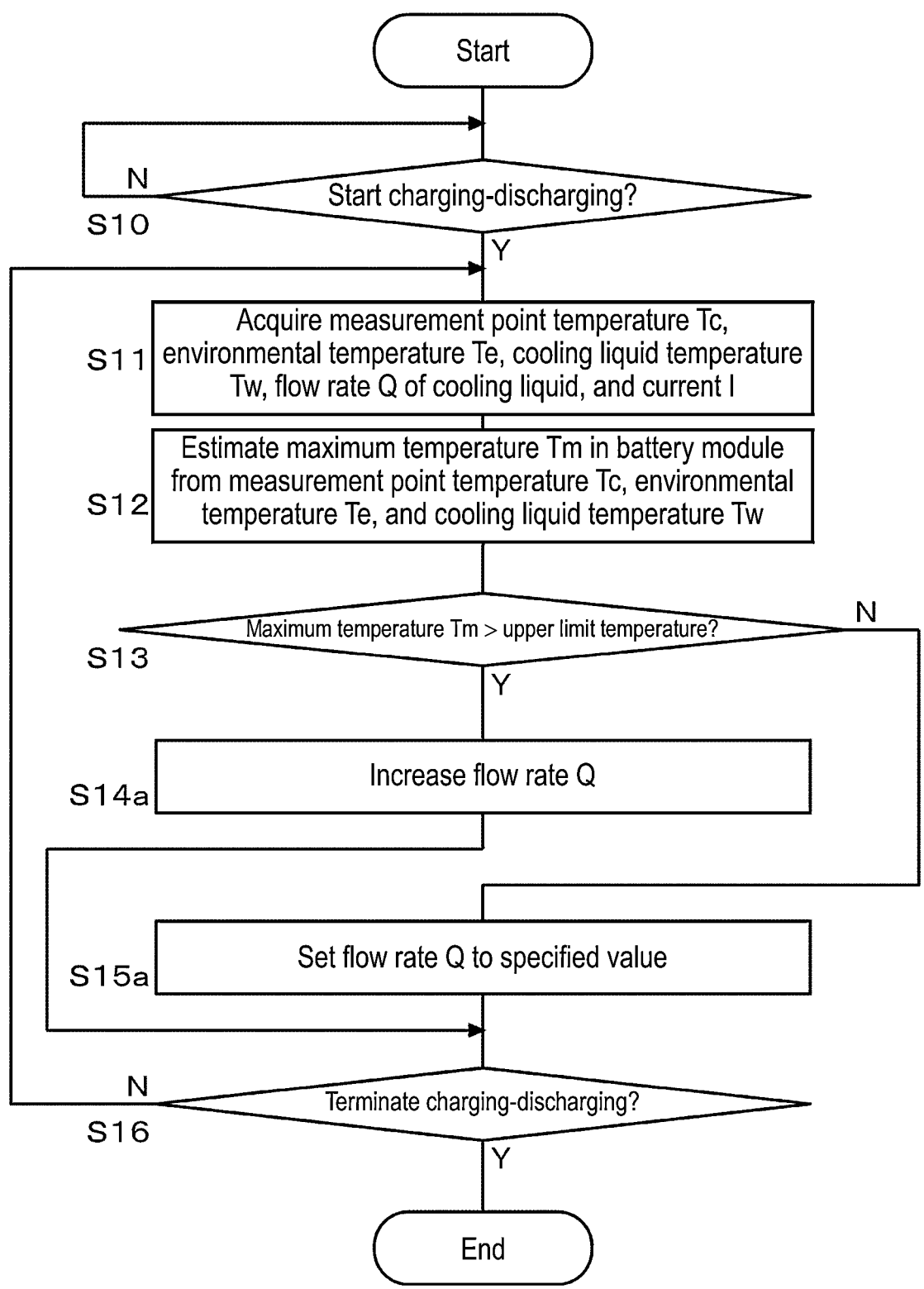
FIG. 9 is a flowchart illustrating temperature control example 2 of the battery module by the controller.

FIG. 9 is a flowchart illustrating temperature control example 2 of battery module 11 by controller 12c. Temperature control example 2 is an example in which temperature of battery module 11 is controlled by controlling flow rate Q of the cooling liquid instead of current I. Hereinafter, differences from the flowchart of temperature control example 1 illustrated in FIG. 8 will be described.

When maximum temperature Tm exceeds the upper limit temperature in step S13 (Y in S13), controller 12c transmits an instruction signal to management unit 22 of cooling system 20 to instruct to increase flow rate Q of the cooling liquid (14a).

When maximum temperature Tm is less than or equal to the upper limit temperature in step S13 (N in S13), step S14a is skipped. Further, controller 12c transmits an instruction signal to management unit 22 of cooling system 20 to instruct to restore flow rate Q of the cooling liquid to a specified value (15a). Processes other than these are the same as the processes illustrated in the flowchart of FIG. 8.

In temperature control example 2, a function of acquiring flow rate Q from flow rate sensor F1 and a function of adjusting flow rate Q by electric pump 21 of cooling system 20 are necessary. On the other hand, in temperature control example 1, the function of acquiring flow rate Q from flow rate sensor F1 and the function of adjusting flow rate Q by electric pump 21 are not necessary. In temperature control example 1, a configuration without flow rate sensor F1 is also possible. Further, flow rate Q delivered from cooling system 20 may be fixed at all times.

Further, the control of current I illustrated in temperature control example 1 and the control of flow rate Q illustrated in temperature control example 2 may be used together. In this case, the temperature of battery module 11 can be lowered earlier.

Further, in a case where cooling system 20 has a function of adjusting the temperature of the cooling liquid, if maximum temperature Tm exceeds the upper limit temperature, controller 12c may transmit an instruction signal to management unit 22 of cooling system 20 so as to instruct to lower temperature Tw of the cooling liquid. It is also possible to use the control of temperature Tw of the cooling liquid and the control of current I and/or the control of flow rate Q of the cooling liquid together.

FIGS. 10A and 10B are diagrams illustrating specific images of time transitions of measurement point temperature Tc and maximum temperature Tm. FIG. 10A illustrates time transitions of measurement point temperature Tc and maximum temperature Tm when the temperature control is performed in such a way that measurement point temperature Tc does not exceed the upper limit temperature according to a conventional technique. FIG. 10B illustrates time transitions of measurement point temperature Tc and maximum temperature Tm when the temperature control is performed in such a way that maximum temperature Tm does not exceed the upper limit temperature according to the present exemplary embodiment.

In the example illustrated in FIG. 10A, the current limitation is started when measurement point temperature Tc exceeds the upper limit temperature, but at a timing when the current limitation is started, maximum temperature Tm in battery module 11 has already exceeded the upper limit temperature. Even in a state that measurement point temperature Tc is maintained at the upper limit temperature, maximum temperature Tm in battery module 11 exceeds the upper limit temperature. On the other hand, in the example illustrated in FIG. 10B, the current limitation is started when maximum temperature Tm estimated from measurement point temperature Tc exceeds the upper limit temperature, and thus maximum temperature Tm does not exceed the upper limit temperature.

As described above, according to the present exemplary embodiment, maximum temperature Tm in battery module 11 is estimated from a plurality of parameter values including measurement point temperature Tc, and the current is limited and/or control cooling system 20 is controlled in such a way that estimated maximum temperature Tm does not exceed the upper limit temperature. Thus, degradation of cells En in battery module 11 can be suppressed and battery system 10 can have a long life.

Figure 12:
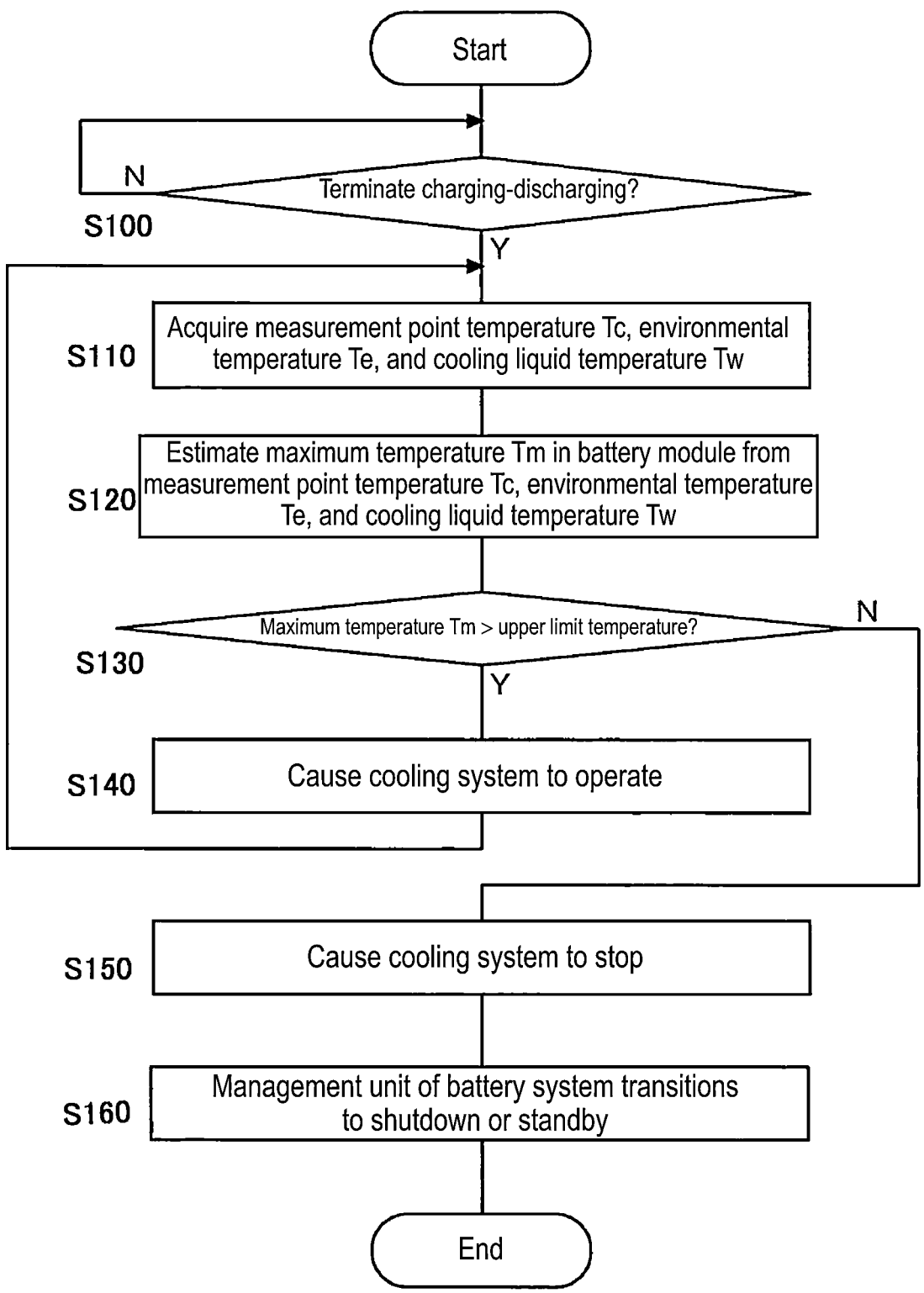
FIG. 12 is a flowchart illustrating temperature control example 3 of the battery module by the controller.

FIG. 12 is a flowchart illustrating temperature control example 3 of battery module 11 by controller 12c. When electric vehicle 1 is stopped from a traveling state and powered off, controller 12c turns off first relay 32, shuts off battery system 10 and motor 30, and terminates charging-discharging of battery module 11 (Y in S100). Even if electric vehicle 1 is powered off, management unit 22 of battery system 10 does not immediately power off and continues to operate. Controller 12c acquires measurement point temperature Tc on the surface of cell En from first temperature sensor T1, environmental temperature Te in battery module 11 from second temperature sensor T2, and cooling liquid temperature Tw from third temperature sensor T3 (S110).

Controller 12c estimates maximum temperature Tm in battery module 11 with reference to table 12t based on acquired measurement point temperature Tc, environmental temperature Te, and cooling liquid temperature Tw (S120). Controller 12c compares estimated maximum temperature Tm with a predetermined upper limit temperature (for example, 50° C.) (S130).

When maximum temperature Tm exceeds the upper limit temperature (Y in S130), controller 12c transmits a control signal to management unit 22 of cooling system 20 to cause cooling system 20 to operate (S140). When cooling system 20 is in operation before power-off of electric vehicle 1, the operation of cooling system 20 is continued.

Note that if the flow rate of the cooling liquid delivered from electric pump 21 before power-off of electric vehicle 1 is not the maximum, controller 12c may transmit an instruction signal to management unit 22 of cooling system 20 to instruct to increase flow rate Q of the cooling liquid. For example, controller 12c may instruct to maximize flow rate Q of the cooling liquid.

Further, when cooling system 20 has a function of adjusting the temperature of the cooling liquid, if temperature Tw of the cooling liquid delivered from electric pump 21 before power-off of electric vehicle 1 is not the minimum temperature, controller 12c may transmit an instruction signal to management unit 22 of cooling system 20 to instruct to lower temperature Tw of the cooling liquid. For example, controller 12c may instruct to minimize temperature Tw of the cooling liquid.

When maximum temperature Tm is less than or equal to the upper limit temperature in step S130 (N in S130), controller 12c transmits an instruction signal to management unit 22 of cooling system 20 to stop cooling system 20 (S150). Thereafter, management unit 22 of battery system 10 transitions to shutdown or standby (S160).

Figure 13:
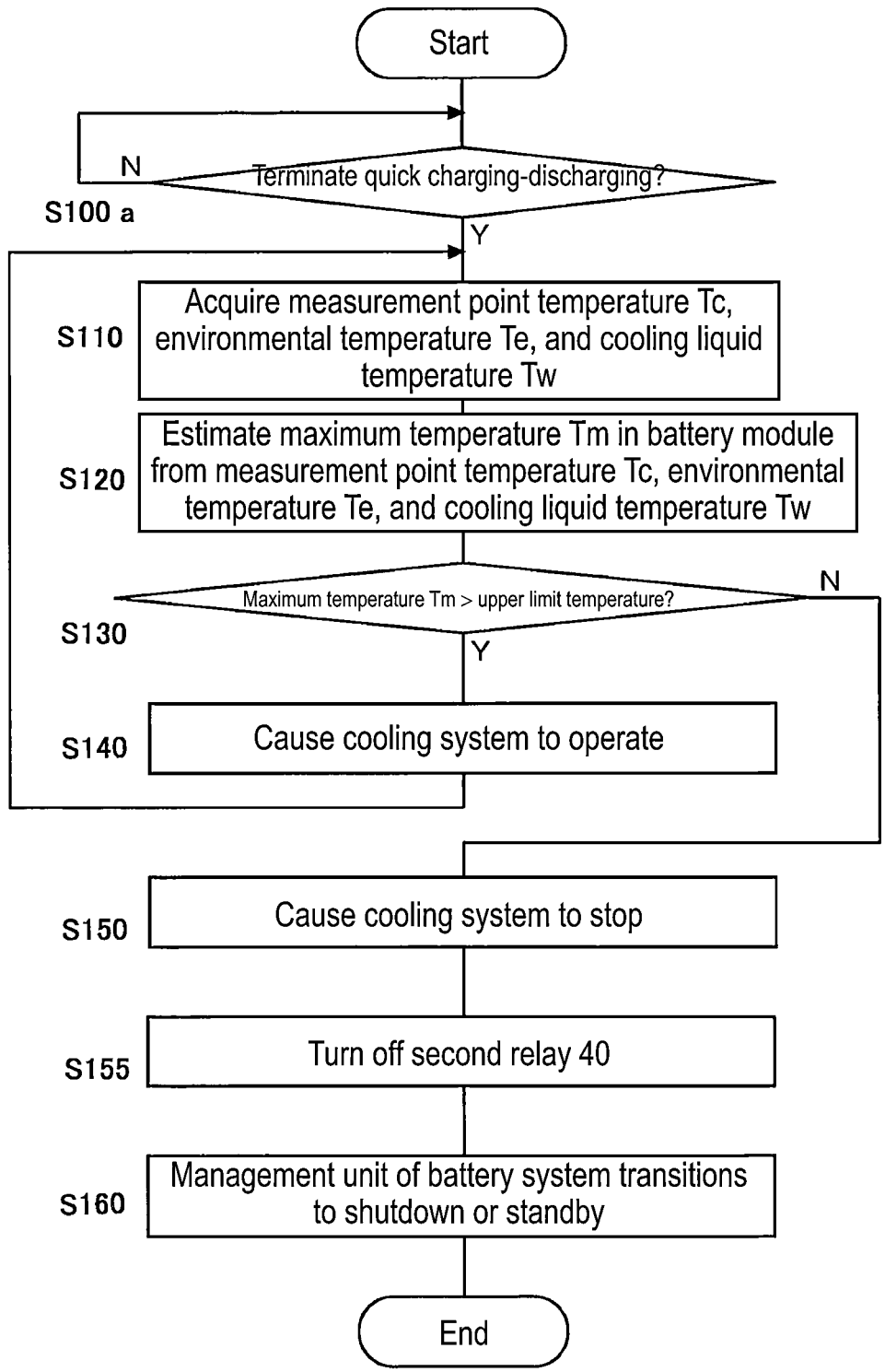
FIG. 13 is a flowchart illustrating temperature control example 4 of the battery module by the controller.

FIG. 13 is a flowchart illustrating temperature control example 4 of battery module 11 by controller 12c. Temperature control example 4 is not control after power-off after finishing traveling of electric vehicle 1, but control after completion of quick charging from charger 2 to battery system 10. During the quick charging, controller 12c controls second relay 40 to be in an ON state. Even when the quick charging is completed (Y in S100a), the user does not disconnect charging cable 4, and controller 12c maintains second relay 40 in the ON state.

Processes from step S110 to step S150 are the same as the processes of temperature control example 3 illustrated in FIG. 12. Even after the completion of quick charging, the main current path connecting between battery system 10 and inverter 31 is electrically conducted with charger 2, and thus the power source of cooling system 20 is provided from commercial power system 3 via charger 2. Therefore, it is possible to prevent capacity of battery module 11 from decreasing due to operation of cooling system 20 after completion of the quick charging.

When cooling system 20 is stopped (S150), controller 12c turns off second relay 40 (S155). Thereafter, management unit 22 of battery system 10 transitions to shutdown or standby (S160). The user removes charging cable 4 from electric vehicle 1.

Figure 14A:
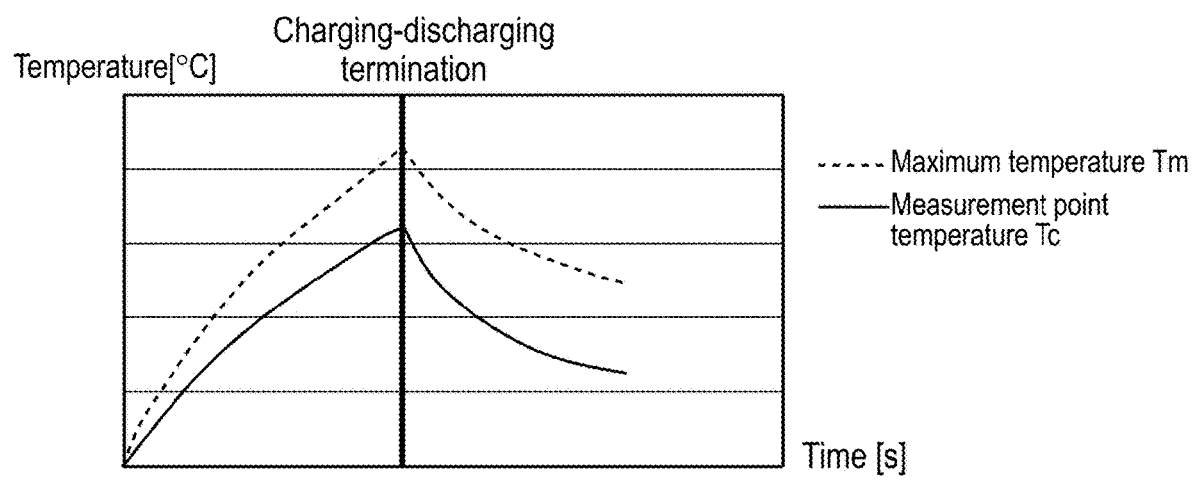
FIG. 14A is a diagram illustrating specific image of time transitions of the measurement point temperature and the maximum temperature before and after termination of charging-discharging of battery module 11 in the conventional technique
Figure 14B:
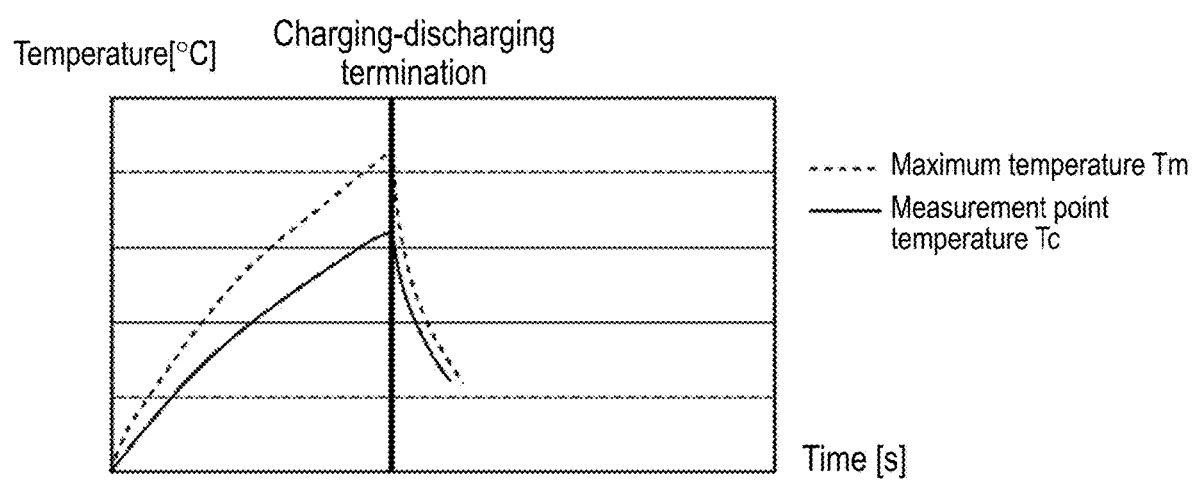
FIG. 14B is a diagram illustrating specific image of time transitions of the measurement point temperature of the maximum temperature before and after termination of charging-discharging of battery module 11 in the present invention.

FIGS. 14A and 14B are diagrams illustrating specific images of time transitions of measurement point temperature Tc and maximum temperature Tm. FIG. 14A illustrates time transitions of measurement point temperature Tc and maximum temperature Tm before and after termination of charging-discharging of battery module 11 according to the conventional technique. In FIG. 14A, cooling system 20 does not operate after the termination of the charging-discharging of battery module 11. FIG. 14B illustrates time transitions of measurement point temperature Tc and maximum temperature Tm before and after the termination of the charging-discharging of battery module 11 according to the present exemplary embodiment. In FIG. 14B, cooling system 20 operates after the termination of the charging-discharging of battery module 11. Comparing the two, measurement point temperature Tc and maximum temperature Tm fall faster in the example illustrated in FIG. 14B.

As described above, according to the present exemplary embodiment, even after termination of charging-discharging of battery module 11, the time for the cells in battery module 11 to maintain a high temperature state can be shortened by continuing to cool battery module 11 for a certain period of time. Thus, storage degradation of the cells in battery module 11 can be suppressed, and battery system 10 can have a long life. Further, maximum temperature Tm in battery module 11 is estimated from a plurality of parameter values including measurement point temperature Tc, and by controlling cooling after termination of charging-discharging based on estimated maximum temperature Tm, storage degradation of the cells in battery module 11 can be suppressed more than in a case of controlling cooling after termination of charging-discharging based on measurement point temperature Tc.

The present invention has been described above based on the present exemplary embodiment. It is understood by the person of ordinary skill in the art that the exemplary embodiment is an exemplification, that various modified examples can be made to the combinations of their respective configuration element and respective processing processes, and that such modifications are also within the scope of the present invention.

FIG. 6 above describes the example of deriving the relationships between three parameters of measurement point temperature Tc, environmental temperature Te, and cooling liquid temperature Tw and maximum temperature Tm based on numerical simulations and experiments, and creating a database or a function therefrom. In this respect, the parameters for estimating maximum temperature Tm are not limited to the above three parameters.

FIG. 11 illustrates table 12t defining the relationships between measurement point temperature Tc on the surface of cell En, environmental temperature Te in battery module 11, cooling liquid temperature Tw, flow rate Q of the cooling liquid, and current I flowing in battery module 11 and maximum temperature Tm in battery module 11. Based on numerical simulations and experiments in advance, the designer derives maximum temperature Tm for each of various combinations of five parameters of measurement point temperature Tc, environmental temperature Te, cooling liquid temperature Tw, flow rate Q, and current I, and creates a database of relationships of them. In particular, it is preferred that the parameters include current I because current I has a great influence on the temperature inside the cell.

Note that maximum temperature Tm may be derived for each of various combinations of four parameters of measurement point temperature Tc, environmental temperature Te, cooling liquid temperature Tw, and current I, or maximum temperature Tm may be derived for each of various combinations of four parameters of measurement point temperature Tc, environmental temperature Te, cooling liquid temperature Tw, and flow rate Q.

Note that maximum temperature Tm may be derived for each of various combinations of four parameters of measurement point temperature Tc, environmental temperature Te, cooling liquid temperature Tw, and the SOH of cell. Since the cell has a property that the temperature tends to rise as the SOH decreases (degradation progresses), maximum temperature Tm can be more accurately estimated by including the SOH in the parameters.

Further, as a simple estimation model, maximum temperature Tm may be derived for each of various combinations of two parameters of environmental temperature Te and cooling liquid temperature Tw, or maximum temperature Tm may be derived for each of various combinations of two parameters of measurement point temperature Tc and cooling liquid temperature Tw. Further, as a simplest estimation model, maximum temperature Tm may be derived for each of various values of environmental temperature Te, or maximum temperature Tm may be derived for each of various values of measurement point temperature Tc. For example, when a battery of a type that generates a small amount of heat is used or when the upper limit temperature is set low, temperature control of battery module 11 based on such a simple model is also possible.

Further, in operation, as measurement point temperature Tc, the highest temperature among temperatures measured by the plurality of first temperature sensors T1 in battery module 11 may be used. That is, in operation, first temperature sensor T1 employed as measurement point temperature Tc may be dynamically switched.

Although cooling system 20 of liquid cooling type has been described in the above exemplary embodiment, cooling system of air cooling type may be employed. In this case, the cooling liquid in the above exemplary embodiment is replaced with cooling air. That is, controller 12c acquires a temperature of the cooling air instead of temperature Tw of the cooling liquid. When estimated maximum temperature Tm exceeds the upper limit temperature, controller 12c can request management unit 22 of cooling system 20 to increase a cooling air volume and/or decrease a cooling air temperature.

In the description of the flowcharts illustrated in FIGS. 8 and 9 above, the traveling period of electric vehicle 1 is assumed as the period during which charging-discharging of battery system 10 is performed, but it may be a period in which charging from charger 2 of electric vehicle 1 is performed. Particularly in a case of quick charging with a large current, battery module 11 generates heat, and thus cooling by cooling system 20 and/or temporary restriction of the charging current is effective.

In the exemplary embodiment described above, an example in which the temperature control described above is used in battery system 10 for in-vehicle use has been described, but the temperature control described above can also be used in battery system 10 for stationary power storage. Further, the temperature limitation described above can be used also in battery system 10 for electronic device applications such as laptop PCs and smartphones.

Note that the exemplary embodiment may be specified by the following items.

[Item 1]

Battery system (10) including:
- battery module (11) that includes a plurality of cells (E1 to En); and
- management unit (12) that manages charging-discharging of battery module (11) and a temperature inside battery module (11),
- in which management unit (12) estimates a maximum temperature of an inside of cell (En) in battery module (11) based on a measured temperature in battery module (11), and controls, during charging-discharging of battery module (11), a charging-discharging current of battery module (11) and/or cooling of battery module (11) in such a way that the estimated maximum temperature does not exceed an upper limit temperature.

Thus, since the temperature of battery module (11) is controlled based on the estimated maximum temperature inside cell (En) in battery module (11), degradation of the plurality of cells (E1 to En) can be suppressed.

[Item 2]

Battery system (10) including;
- battery module (11) that includes a plurality of cells (E1 to En); and
- management unit (12) that manages charging-discharging of battery module (11) and a temperature inside battery module (11),
- in which management unit (12) estimates a maximum temperature of an inside of cell (En) in battery module (11) based on a measured temperature in battery module (11), and cools battery module (11) when the estimated maximum temperature exceeds an upper limit temperature after termination of charging-discharging of battery module (11) until the estimated maximum temperature becomes less than or equal to the upper limit temperature.

With this configuration, since battery module (11) is cooled after the termination of charging-discharging of battery module (11), storage degradation of the plurality of cells (E1 to En) can be suppressed.

[Item 3]

Battery system (10) according to item 1 or 2, further including;
- cooling member (13) that allows a cooling liquid to pass inside and cools a part of the plurality of cells (E1 to En) in battery module (11);
- first temperature sensor (T1) that is placed on a surface of any one of the plurality of cells (E1 to En);
- second temperature sensor (T2) that measures an environmental temperature in battery module (11) or in a battery pack including battery module (11); and
- third temperature sensor (T3) that measures a temperature of the cooling liquid,
- in which management unit (12) retains table (12t) or a function that is created in advance and defines relationships between a plurality of conditions including a measured temperature of a surface of cell (En), environmental temperature in battery module (11) or in the battery pack, and a temperature of the cooling liquid and the maximum temperature, and the maximum temperature is estimated using table (12*t*) or the function.

With this configuration, the maximum temperature inside cell (En) in battery module (11) can be estimated with high accuracy.

[Item 4]

Battery system (10) according to item 3, further including current sensor (13*b*) that measures a current flowing through battery module (11), in which management unit (12) retains table (12*t*) or a function that is created in advance and defines relationships between a plurality of conditions including a measured temperature of a surface of cell (En), an environmental temperature in battery module (11) or in the battery pack, a temperature of the cooling liquid, and a current that flows through battery module (11) and the maximum temperature, and the maximum temperature is estimated using table (12*t*) or the function.

With this configuration, the maximum temperature inside cell (En) in battery module (11) can be estimated with higher accuracy.

[Item 5]

Battery system (10) according to item 3 or 4, in which first temperature sensor (T1) is placed on a surface of cell (En) in which a temperature of the inside is a maximum temperature in battery module (11).

With this configuration, the maximum temperature inside cell (En) in battery module (11) can be estimated based on a temperature measured by first temperature sensor (T1) installed on the surface of cell (En).

[Item 6]

Battery system (10) according to any one of items 1 to 5, in which battery system (10) is mounted on electric vehicle (1), and
when the estimated maximum temperature exceeds the upper limit temperature, management unit (12) reduces an amount of current supplied from battery module (11) to running motor (30) in electric vehicle (1).

With this configuration, the temperature of battery module (11) mounted on electric vehicle (1) can be lowered.

[Item 7]

Battery system (10) according to any one of items 1 to 5, in which battery system (10) is mounted on electric vehicle (1), and
when the estimated maximum temperature exceeds the upper limit temperature, management unit (12) transmits an instruction signal to cooling system (20) in electric vehicle (1) to increase a flow rate of the cooling liquid supplied to battery module (11).

With this configuration, the temperature of battery module (11) mounted on electric vehicle (1) can be lowered.

[Item 8] Battery system (10) according to item 7, in which when the estimated maximum temperature exceeds the upper limit temperature after power-off of electric vehicle (1), management unit (12) causes cooling of battery module (11) until the estimated maximum temperature becomes less than or equal to the upper limit temperature.

With this configuration, the temperature of battery module (11) can be lowered early after power-off of electric vehicle (1).

[Item 9]

Battery system (10) according to item 7, in which when the estimated maximum temperature exceeds the upper limit temperature after termination of charging from charger (2) installed outside electric vehicle (1), management unit (12) causes cooling of battery module (11) until the estimated maximum temperature becomes less than or equal to the upper limit temperature.

With this configuration, the temperature of battery module (11) can be lowered early after external charging of electric vehicle (1).

[Item 10]

Battery system (10) according to item 9, in which after termination of charging from charger (2), management unit (12) performs control in such a way that cooling system (20) is provided with a power source from charger (2) until the estimated maximum temperature becomes less than or equal to the upper limit temperature.

With this configuration, it is possible to prevent capacity of battery module (11) from decreasing due to the operation of cooling system (20) after external charging of electric vehicle (1).

REFERENCE MARKS IN THE DRAWINGS 1 electric vehicle
2 charger
3 commercial power system
4 charging cable
5*a* injection pipe
5*b* discharge pipe
10 battery system
11 battery module
12 management unit
12*a* voltage measurer
12*b* current measurer
12*c* controller
E1, E2, En cell
Rs shunt resistor
T1 first temperature sensor
T2 second temperature sensor
T3 third temperature sensor
F1 flow rate sensor
13 cooling plate
13*i* inlet
13*o* outlet
14*o* exterior can
14*e* electrode body
20 cooling system
21 electric pump
22 management unit
25 DC-DC current converter
30 motor
31 inverter
32 first relay
40 second relay

The invention claimed is:

1. A battery system comprising:
a battery module that includes a plurality of cells;
a management unit that manages charging-discharging of the battery module and a temperature inside the battery module;
a cooling member that allows a cooling liquid to pass inside the cooling member and cools a part of the plurality of cells in the battery module;
a first temperature sensor that is placed on a surface of any one of the plurality of cells;

a second temperature sensor that measures an environmental temperature in the battery module or in a battery pack including the battery module; and a third temperature sensor that measures a temperature of the cooling liquid, wherein:

the management unit estimates a maximum temperature of an inside of one of the cells in the battery module based on a temperature measured in the battery module, and controls, during charging-discharging of the battery module, at least one of (i) a charging-discharging current of the battery module and (ii) cooling of the battery module to prevent the estimated maximum temperature from exceeding an upper limit temperature, and the management unit retains a table or a function that is created in advance and defines relationships between a plurality of conditions and the maximum temperature, the plurality of conditions including a measured temperature of a surface of one of the cells, an environmental temperature in the battery module or in the battery pack, and a temperature of the cooling liquid, and estimates the maximum temperature using the table or the function.

2. A battery system comprising:

a battery module that includes a plurality of cells;

a management unit that manages charging-discharging of the battery module and a temperature inside the battery module;

a cooling member that allows a cooling liquid to pass inside the cooling member and cools a part of the plurality of cells in the battery module;

a first temperature sensor that is placed on a surface of any one of the plurality of cells;

a second temperature sensor that measures an environmental temperature in the battery module or in a battery pack including the battery module; and a third temperature sensor that measures a temperature of the cooling liquid, wherein:

the management unit estimates a maximum temperature of an inside of one of cells in the battery module based on a temperature measured in the battery module, and when the estimated maximum temperature exceeds an upper limit temperature after termination of charging-discharging of the battery module, cools the battery module until the estimated maximum temperature becomes less than or equal to the upper limit temperature, and the management unit retains a table or a function that is created in advance and defines relationships between a plurality of conditions and the maximum temperature, the plurality of conditions including a measured temperature of a surface of one of the cells, an environmental temperature in the battery module or in the battery pack, and a temperature of the cooling liquid, and estimates the maximum temperature using the table or the function.

3. The battery system according to claim 1, further comprising a current sensor that measures a current flowing through the battery module, wherein the management unit retains a table or a function that is created in advance and defines relationships between a plurality of conditions and the maximum temperature, the plurality of conditions including a measured temperature of a surface of one of the cells, an environmental temperature in the battery module or in the battery pack, a temperature of the cooling liquid, and a current that flows through the battery module, and estimates the maximum temperature using the table or the function.

4. The battery system according to claim 1, wherein the first temperature sensor is placed on a surface of a cell in which a temperature of the inside is a maximum temperature in the battery module.

5. The battery system according to claim 1, wherein
the battery system is mounted on an electric vehicle, and
when the estimated maximum temperature exceeds the upper limit temperature, the management unit reduces an amount of current supplied from the battery module to a running motor in the electric vehicle.

6. The battery system according to claim 1, wherein
the battery system is mounted on an electric vehicle, and
when the estimated maximum temperature exceeds the upper limit temperature, the management unit transmits an instruction signal to a cooling system in the electric vehicle to increase a flow rate of the cooling liquid supplied to the battery module.

7. The battery system according to claim 6, wherein when the estimated maximum temperature exceeds the upper limit temperature after power-off of the electric vehicle, the management unit causes cooling of the battery module until the estimated maximum temperature becomes less than or equal to the upper limit temperature.

8. The battery system according to claim 6, wherein when the estimated maximum temperature exceeds the upper limit temperature after termination of charging from a charger installed outside the electric vehicle, the management unit causes cooling of the battery module until the estimated maximum temperature becomes less than or equal to the upper limit temperature.

9. The battery system according to claim 8, wherein after termination of charging from the charger, the management unit performs control to cause the cooling system provided with a power source from the charger until the estimated maximum temperature becomes less than or equal to the upper limit temperature.

* * * * *